United States Patent
Mori et al.

(10) Patent No.: US 8,417,249 B2
(45) Date of Patent: Apr. 9, 2013

(54) MOBILE COMMUNICATION SYSTEM, BASE STATION CONTROLLER, BASE STATION, AND BASE STATION STATE CONTROL METHOD

(75) Inventors: Shinichi Mori, Yokohama (JP); Akira Ishii, Yokosuka (JP); Mikio Iwamura, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 12/596,942

(22) PCT Filed: Apr. 25, 2008

(86) PCT No.: PCT/JP2008/058086
§ 371 (c)(1),
(2), (4) Date: Feb. 5, 2010

(87) PCT Pub. No.: WO2008/136416
PCT Pub. Date: Nov. 13, 2008

(65) Prior Publication Data
US 2010/0151852 A1 Jun. 17, 2010

(30) Foreign Application Priority Data

Apr. 27, 2007 (JP) ................................. 2007-120263
Aug. 13, 2007 (JP) ................................. 2007-211093

(51) Int. Cl.
*H04W 36/00* (2009.01)
(52) U.S. Cl. ...................... 455/444; 455/456.1; 455/436; 455/552.1; 455/426.1; 370/328; 370/338
(58) Field of Classification Search ............... 455/552.1, 455/553.1, 426.1, 456.1–457, 41.1–41.3, 455/432.1–444; 370/328, 338
See application file for complete search history.

(56) References Cited

U.S. PATENT DOCUMENTS

| 6,347,226 B1 * | 2/2002 | Virtanen ........................ 455/450 |
| 6,584,330 B1 * | 6/2003 | Ruuska ......................... 455/574 |
| 2007/0066273 A1 * | 3/2007 | Laroia et al. ............... 455/343.2 |
| 2007/0097983 A1 * | 5/2007 | Nylander et al. .......... 370/395.2 |

FOREIGN PATENT DOCUMENTS

| JP | 62-069739 A | 3/1987 |
| JP | 06-269039 A | 9/1994 |
| JP | 07-170566 A | 7/1995 |
| JP | 07-298340 A | 11/1995 |

(Continued)

OTHER PUBLICATIONS

International Search Report w/translation from PCT/JP2008/058086 dated Jul. 29, 2008 (4 pages).

(Continued)

*Primary Examiner* — Lester Kincaid
*Assistant Examiner* — Daniel Lai
(74) *Attorney, Agent, or Firm* — Osha Liang LLP

(57) ABSTRACT

A mobile communication system includes an association requesting unit provided in a base station and configured to request a base station controller, which is an upper node, to associate the base station with a tracking area; and a state control unit provided in the base station controller and configured to monitor entry or appearance and exit or disappearance of mobile stations in and from the tracking area associated with the base station, to cause the base station to transition to a serving state if at least one of the mobile stations enters or appears in the tracking area, and to cause the base station to transition to a radio-unit-inactive state if all of the mobile stations exit or disappear from the tracking area.

4 Claims, 8 Drawing Sheets

FOREIGN PATENT DOCUMENTS

| | | |
|---|---|---|
| JP | 10-145842 A | 5/1998 |
| JP | 2003-174665 A | 6/2003 |
| JP | 2006-067507 A | 3/2006 |
| JP | 2008-109423 A | 5/2008 |
| WO | 2007035446 A1 | 3/2007 |

OTHER PUBLICATIONS

Written Opinion from PCT/JP2008/058086 dated Jul. 29, 2008 (4 pages).

Patent Abstracts of Japan; Publication No. 2008-109423 dated May 8, 2008; Fujitsu Ltd. (1 page).

Patent Abstracts of Japan; Publication No. 07-298340 dated Nov. 10, 1995; Fujitsu Ltd. (1 page).

Patent Abstracts of Japan; Publication No. 10-145842 dated May 29, 1998; NEC Corp. (1 page).

Patent Abstracts of Japan; Publication No. 2003-174665 dated Jun. 20, 2003; NTT DoCoMo Inc. (1 page).

Patent Abstracts of Japan; Publication No. 07-170566 dated Jul. 4, 1995; NEC Corp. (1 page).

3GPP TSG RAN #35, RP-070209; "Requirements for LTE Home eNodeBs"; Organge, Telecom Italia et al.; Lemesos, Cyprus; Mar. 6-9, 2007 (4 pages).

Chinese Office Action for Application No. 200880022554.4, mailed on Mar. 6, 2012 (12 pages).

Patent Abstracts of Japan for Japanese Publication No. 06-269039, publication date Sep. 22, 1994 (1 page).

Japanese Office Action for Application No. 2009-512982, mailed on Apr. 17, 2012 (5 pages).

Patent Abstracts of Japan for Japanese Publication No. 62-069739, publication date Mar. 31, 1987 (1 page).

Patent Abstracts of Japan for Japanese Publication No. 2006-067507, publication date Mar. 9, 2006 (1 page).

\* cited by examiner

MOBILE COMMUNICATION SYSTEM, BASE STATION CONTROLLER, BASE STATION, AND BASE STATION STATE CONTROL METHOD

TECHNICAL FIELD

The present invention relates to a mobile communication system, a base station controller, a base station, and a base station state control method.

BACKGROUND ART

Public base stations for public communications in a mobile communication system continuously provide service after the service is started by a network administrator to respond to irregular connection requests from users.

For example, the network administrator starts the service as follows:

(1) After installing the base station and connecting lines, turn on the base station and connect it to an upper node.

(2) Set various parameters of the base station via a network or by manually entering the parameters.

After the parameters are set and the service of the base station is started, the service is continuously provided without interruption unless the base station fails or it is necessary to restart the base station due to change in the device configuration. When uninstalling the base station, the base station is turned off after stopping the service.

Although operations of public base stations are described above, similar operations may be applied to home base stations (home eNodeB) used for small areas such as homes (see, for example, 3GPP TSG RAN #35 RP-070209 Lemesos, Cyprus, 6-9 Mar. 2007 (http://www.3gpp.org/ftp/tsg_ran/TSG_RAN/TSGR_35/Docs/).

DISCLOSURE OF INVENTION

Problems to be Solved by the Invention

There are the following problems in using home base stations that continuously provide service as related-art base stations:

(1) A private base station for a closed subscriber group (CSG) receives connection requests from a specific group of users and therefore signals transmitted from the private base station are not used when the users are not near the private base station.

(2) Such transmission of signals results in waste of electric power. Also, common control channels transmitted from the private base station cause interference with other cells even when no user is connected. The interference in turn reduces the communication quality of users who do not belong to the private base station. The interference also reduces the channel capacity of a base station other than the private base station.

(3) Since a large number of private base stations are expected to be installed (for example, one for each home), the above problems may become non-negligible.

Meanwhile, a private base station may be manually started and stopped by its users. However, this method has problems as described below.

(4) Handover of a current communication session may fail before the private base station is started. For example, when a user communicating with a public base station out of doors enters a home where a private base station is installed, the handover of the communication may fail if the private base station is not started manually in time.

(5) When stopping the private base station, it is necessary to take into account other users (e.g., other family members) of the private base station. This may complicate the operations of the private base station and as a result, starting and stopping of the private base station may not actually be performed.

One object of the present invention is to solve or reduce one or more of the above problems and to provide a mobile communication system, a base station controller, a base station, and a base station state control method that make it possible to reduce the power consumption of a private base station and interference with neighboring cells while eliminating the need for manual operations by the owner or users of the private base station.

Means for Solving the Problems

According to an aspect of the present invention, a mobile communication system includes an association requesting unit provided in a base station and configured to request a base station controller, which is an upper node, to associate the base station with a tracking area; and a state control unit provided in the base station controller and configured to monitor entry or appearance and exit or disappearance of mobile stations in and from the tracking area associated with the base station, to cause the base station to transition to a serving state if at least one of the mobile stations enters or appears in the tracking area, and to cause the base station to transition to a radio-unit-inactive state if all of the mobile stations exit or disappear from the tracking area.

According to another aspect of the present invention, a mobile communication system includes an association requesting unit provided in a first base station, and configured to try to receive a radio signal from a second base station when the first base station is turned on and if the radio signal is received, to request a base station controller, which is an upper node, to associate the first base station with a tracking area corresponding to a service area of the second base station; and a state control unit provided in the base station controller and configured to monitor entry or appearance and exit or disappearance of mobile stations allowed to access the first base station in and from the tracking area associated with the first base station, to cause the first base station to transition to a serving state if at least one of the mobile stations enters or appears in the tracking area, and to cause the first base station to transition to a radio-unit-inactive state if all of the mobile stations exit or disappear from the tracking area.

The association requesting unit may be configured to report on a third base station located near the first base station to the base station controller if no neighboring base station is detected and thereby to request the base station controller to associate the first base station with a tracking area of a fourth base station detected by the third base station.

Alternatively, the association requesting unit may be configured to report that no neighboring base station is detectable to the base station controller if no neighboring base station is detected and thereby to request the base station controller to associate the first base station with a special tracking area. In this case, the state control unit causes the first base station associated with the special tracking area to transition to the serving state if a location of at least one of the mobile stations allowed to access the first base station becomes not monitorable or causes the first base station to transition to the radio-unit-inactive state if locations of all of the mobile stations become monitorable.

According to another aspect of the present invention, a base station controller includes an associating unit configured to associate a first base station belonging to the base station controller with a tracking area corresponding to a service area of a second base station when requested by the first base station; and a state control unit configured to monitor entry or appearance and exit or disappearance of mobile stations allowed to access the first base station in and from the tracking area associated with the first base station, to transmit a command to the first base station to cause the first base station to transition to a serving state if at least one of the mobile stations enters or appears in the tracking area, and to transmit a command to the first base station to cause the first base station to transition to a radio-unit-inactive state if all of the mobile stations exit or disappear from the tracking area.

According to another aspect of the present invention, a base station includes an association requesting unit configured to try to receive a radio signal from another base station when the base station is turned on and to request a base station controller, which is an upper node, to associate the base station with a tracking area corresponding to a service area of the other base station if the radio signal is received; and a state management unit configured to cause the base station to transition between a serving state and a radio-unit-inactive state according to a command from the base station controller.

The base station may also include a handover association requesting unit configured, when a mobile station is handed over from an unknown base station to the base station, to request the base station controller to associate the base station with a tracking area corresponding to a service area of the unknown base station.

Still another aspect of the present invention provides a base station state control method including a step, performed by a first base station, of trying to receive a radio signal from a second base station when the first base station is turned on and requesting a base station controller, which is an upper node, to associate the first base station with a tracking area corresponding to a service area of the second base station if the radio signal is received; and a step, performed by the base station controller, of monitoring entry or appearance and exit or disappearance of mobile stations allowed to access the first base station in and from the tracking area associated with the first base station, causing the first base station to transition to a serving state if at least one of the mobile stations enters or appears in the tracking area, and causing the first base station to transition to a radio-unit-inactive state if all of the mobile stations exit or disappear from the tracking area.

Advantageous Effect of the Invention

An aspect of the present invention provides a mobile communication system, a base station controller, a base station, and a base station state control method that make it possible to reduce the power consumption of a private base station and interference with neighboring cells while eliminating the need for manual operations by the owner or users of the private base station.

EXPLANATION OF REFERENCES

Figure 1:
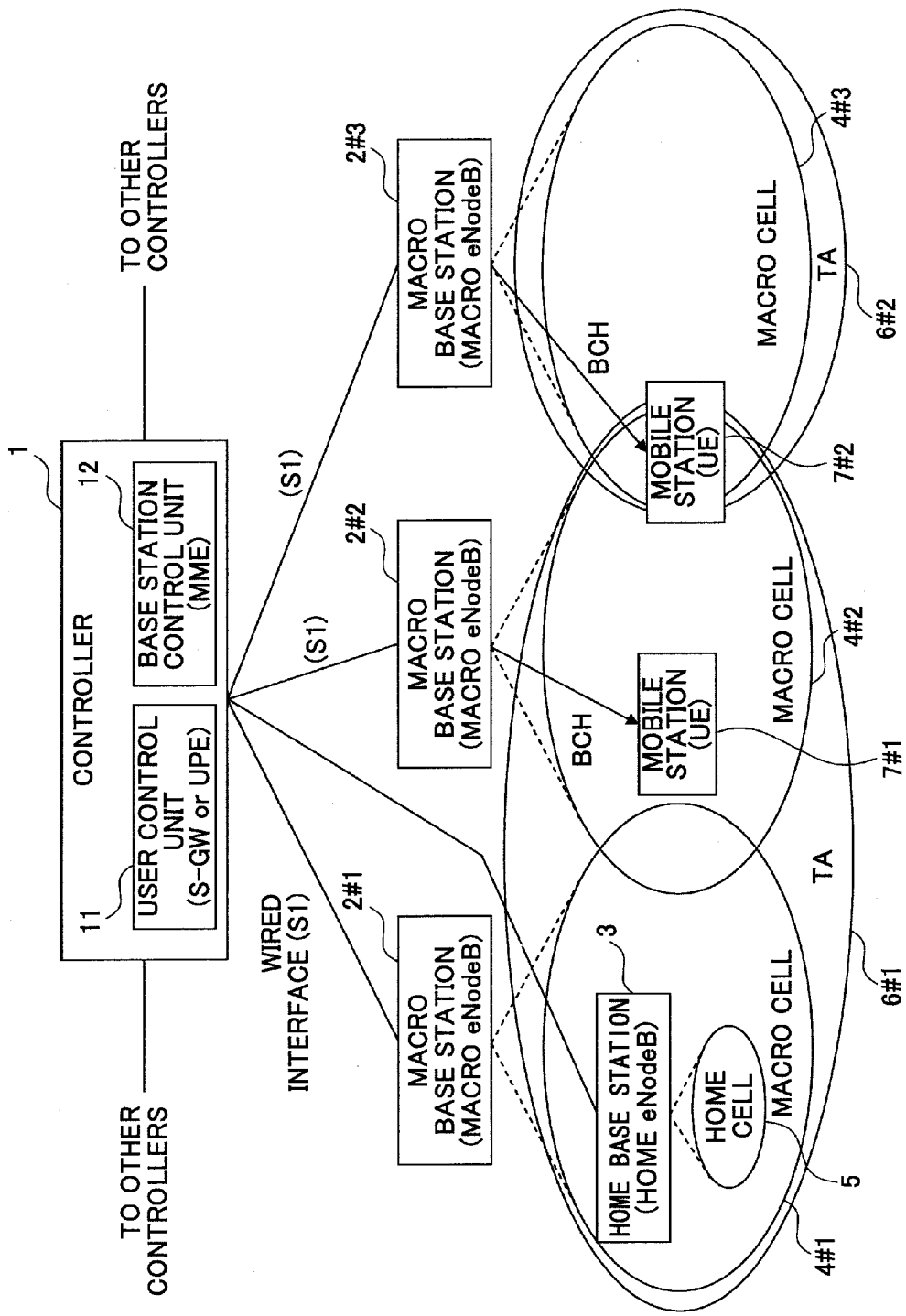
FIG. 1 is a drawing illustrating an exemplary configuration of a mobile communication system according to an embodiment of the present invention.

1 Controller
11 User control unit
12 Base station control unit
1201 Network interface
1202 Base-station-signal receiving unit
1203 Base-station-signal transmitting unit
1204 Home-base-station-state management unit
1205 Home-base-station-user management unit
1206 Location register
1207 Cell-ID-report receiving unit
1208 Tracking area database
1209 Correspondence data generating unit
1210 Memory
1211 Stored data erasing unit
1212 Mobile-station-location monitoring unit
1213 State control command generating unit
2#1-2#3 Macro base station
3 Home base station
301 Receiving antenna
302 Mobile-station-signal receiving unit
303 Transmitting antenna
304 Mobile-station-signal transmitting unit
305 Network interface
306 Receiving antenna
307 Base-station-signal receiving unit
308 Tracking-area-correspondence establishing unit
309 Radio-unit-state management unit
310 Handover information obtaining unit
4#1-4#3 Macro cell
5 Home cell
6#1, 6#2 Tracking area
7#1, 7#2 Mobile station

BEST MODE FOR CARRYING OUT THE INVENTION

Preferred embodiments of the present invention are described below.

FIG. 1 is a drawing illustrating an exemplary configuration of a mobile communication system according to an embodiment of the present invention.

In FIG. 1, a controller 1 is connected via dedicated lines to multiple neighboring controllers according to a mesh topology. The controller 1 includes a user control unit (serving gateway (S-GW) or user plane entity (UPE)) 11 for controlling user data and a base station control unit (mobility management entity (MME)) 12 for controlling base stations.

The controller 1 is connected to multiple macro base stations (macro eNodeB) 2#1, 2#2, and 2#3 via wired interfaces (S1 interfaces) and to a home base station (home eNodeB) 3 via a fixed line such as an asymmetric digital subscriber line (ADSL). The macro base stations 2#1, 2#2, and 2#3 are relatively large-scale base stations installed by telecommunications carriers and the home base station 3 is a small-scale base station installed by, for example, an individual.

A sector or area covered by the macro base station 2#1 is called a macro cell 4#1, a sector or area covered by the macro base station 2#2 is called a macro cell 4#2, and a sector or area covered by the macro base station 2#3 is called a macro cell 4#3. Adjacent macro cells 4#1 and 4#2 and adjacent macro cells 4#2 and 4#3, respectively, are slightly overlapped to smoothly perform handover. An area covered by the home base station 3 is called a home cell 5.

A tracking area (TA) 6#1 is defined to encompass the macro cells 4#1 and 4#2 and a tracking area 6#2 is defined to encompass the macro cell 4#3. A tracking area may be defined to encompass one cell or a cluster of cells. Tracking areas are used as units to manage locations of mobile stations and are managed by an upper layer based on communications between mobile stations and base stations. Instead of defining tracking areas for respective cells, locations of mobile stations may be simply managed based on cells. Also, locations of mobile stations may be managed based on combinations of cells and tracking areas.

In the macro cells 4#1, 4#2, and 4#3, there are mobile stations (user equipment (UE)) 7#1 and 7#2 being carried by users. Here, it is assumed that the mobile station 7#1 receives a common control channel such as a broadcast channel (BCH) from the macro base station 2#2 and the mobile station 7#2 receives a common control channel such as a BCH from the macro base station 2#3.

Figure 2:
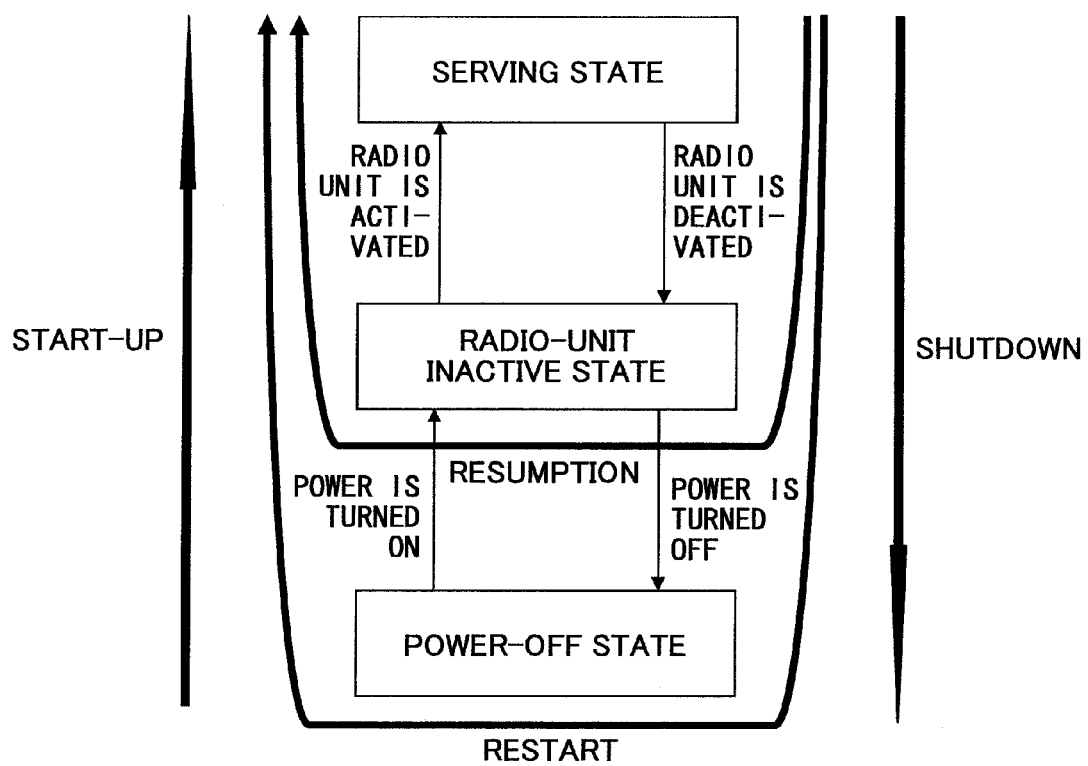
FIG. 2 is a drawing illustrating states of a home base station.

FIG. 2 shows states of the home base station 3. Here, it is assumed that the home base station 3 transitions between the following states: a "power-off state" where the home base station 3 is turned off; a "radio-unit inactive state" where the home base station 3 is turned on but a radio unit of the home base station 3 is turned off; and a "serving state" where the radio unit is turned on. When the power is turned on, the home base station 3 goes into the radio-unit inactive state; and when the power is turned off, the home base station 3 goes into the power-off state. When the radio unit is activated while the home base station 3 is in the radio-unit inactive state, the home base station 3 goes into the serving state; and when the radio unit is deactivated while the home base station 3 is in the serving state; the home base station 3 goes into the radio-unit inactive state.

Causing the home base station 3 to transition from the power-off state to the serving state is called "start-up" and causing the home base station 3 to transition from the serving state to the power-off state is called "shutdown". Also, causing the home base station 3 to transition from the serving state to the power-off state and then return to the serving state is called "restart", and causing the home base station 3 to transition from the serving state to the radio-unit inactive state and then return to the serving state is called "resumption". When the radio unit includes a transmitter and a receiver, only the transmitter may be turned off in the radio-unit inactive state.

First Embodiment

In a first embodiment, a basic application of the present invention is described. In this embodiment, it is assumed that the mobile communication system has a configuration as shown in FIG. 1. It is also assumed that macro base stations and mobile stations have configurations generally employed in a typical mobile communication system.

Figure 3:
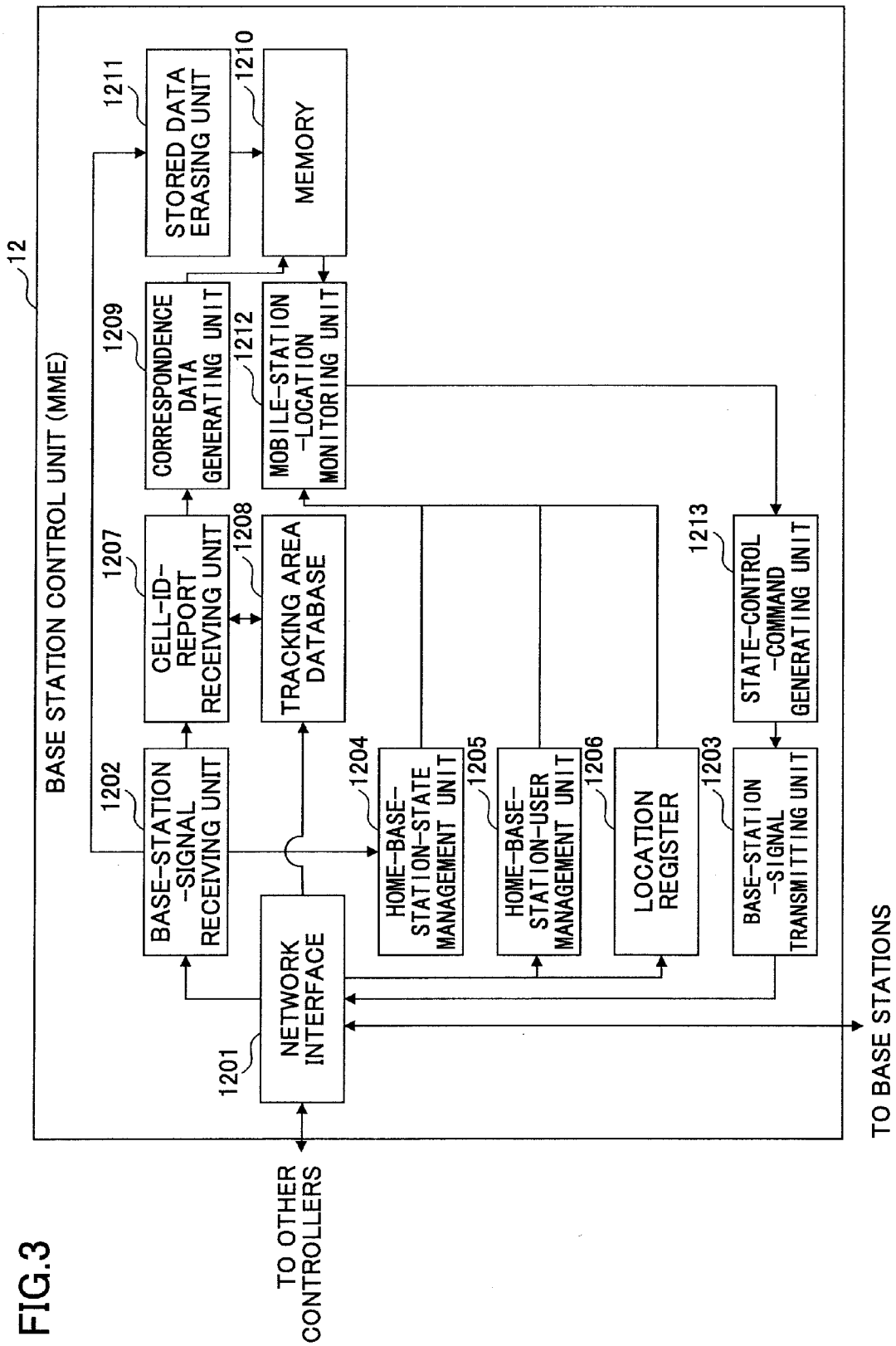
FIG. 3 is a block diagram illustrating an exemplary configuration of a base station control unit.

FIG. 3 shows an exemplary configuration of the base station control unit 12 which is common to the first embodiment and a second embodiment described later.

As shown in FIG. 3, the base station control unit 12 includes a network interface 1201 that communicates via fixed lines with other controllers and base stations (including both macro base stations and home base stations) belonging to the controller 1; a base-station-signal receiving unit 1202 for receiving signals from the base stations via the network interface 1201; and a base-station-signal transmitting unit 1203 for transmitting signals to the base stations via the network interface 1201.

The base station control unit 12 also includes a home-base-station-state management unit 1204 that receives state reports via the base-station-signal receiving unit 1202 from home base stations and stores state information of the respective home base stations obtained from the state reports; a home-base-station-user management unit 1205 that obtains IDs (e.g., phone numbers) of mobile stations (My UE) of users allowed to access the corresponding home base stations from the home base stations or a server and stores the IDs in association with the corresponding home base stations; and a location register 1206 that stores operational statuses and tracking areas (obtained, for example, from a server) of the mobile stations of the users in association with the IDs of the mobile stations.

Also, the base station control unit 12 includes a cell-ID-report receiving unit 1207 that receives cell ID reports (that request the controller 1 to associate cell IDs of neighboring macro base stations identified by the home base stations with the corresponding home base stations) from the home base stations via the base-station-signal receiving unit 1202; and a tracking area database 1208 that is to be referred to by the cell-ID-report receiving unit 1207 and stores the correspondence between cell IDs and tracking areas obtained in advance via the network interface 1201.

Also, the base station control unit 12 includes a correspondence data generating unit 1209 that generates correspondence data associating cell IDs of the home base stations with tracking areas obtained by the cell-ID-report receiving unit 1207 by converting the cell IDs of the neighboring macro base stations with reference to the tracking area database 1208; a memory 1210 for storing the correspondence data; and a stored data erasing unit 1211 that erases the correspondence data stored in the memory 1210 according to correspondence data discarding requests received via the base-station-signal receiving unit 1202 from the home base stations.

Also, the base station control unit 12 includes a mobile-station-location monitoring unit 1212 that monitors whether a mobile station of any user allowed to access a home base station is located in the tracking area associated with the home base station based on: the cell ID of the home base station and the associated tracking area stored in the memory 1210; state information of the home base station stored in the home base station state management unit 1204; the ID of the mobile station of the user allowed to access the home base station which is stored in the home-base-station-user management unit 1205; and the operational status and the tracking area of the mobile station stored in the location register 1206.

Further, the base station control unit 12 includes a state control command generating unit 1213. When any one of the mobile stations of users allowed to access a home base station enters or appears in a tracking area associated with the home base station and if the home base station is in the radio-unit inactive state, the state control command generating unit 1213 generates a control command to cause the home base station to transition to the serving state. Meanwhile, when all of the mobile stations of users allowed to access the home base station exit or disappear from the tracking area associated with the home base station and if the home base station is in the serving state, the state control command generating unit 1213 generates a control command to cause the home base station to transition to the radio-unit inactive state. The state control command generating unit 1213 requests the base-station-signal transmitting unit 1203 to transmit the generated control command to the home base station. Here, entry of a mobile station into a tracking area may indicate not only the physical movement of the mobile station, but also a change in the operational status of the mobile station (for example, a mobile station in the standby mode starts communications, i.e., initiates a call or receives an incoming call). Also, exit of a mobile station from a tracking area may indicate not only the physical movement of the mobile station, but also a change in the operational status of the mobile station (for example, a communicating mobile station goes into the standby mode, i.e., terminates a call).

Figure 4:
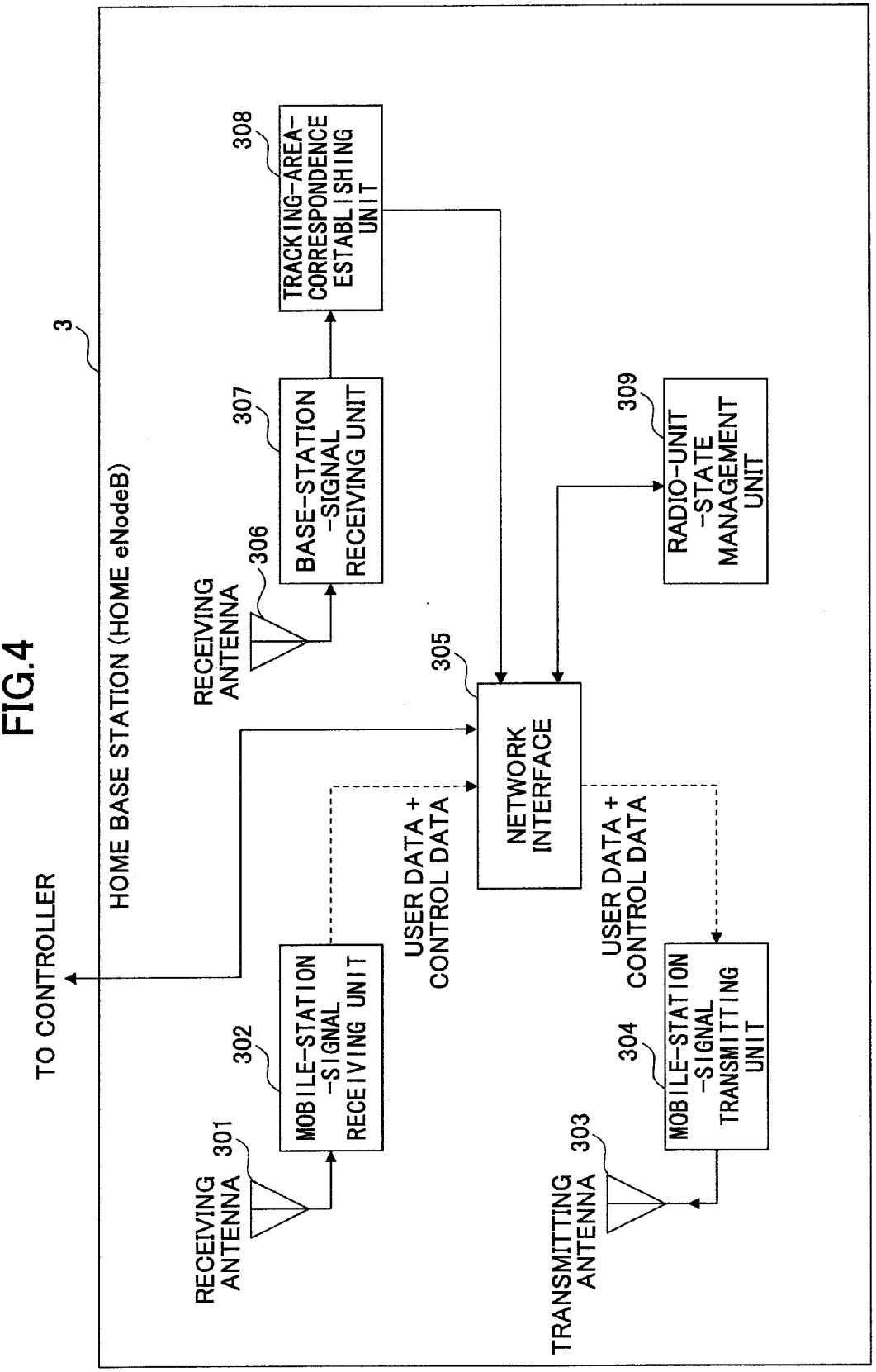
FIG. 4 is a block diagram illustrating an exemplary configuration of a home base station according to a first embodiment.

FIG. 4 is a block diagram illustrating an exemplary configuration of the home base station 3 according to the first embodiment of the present invention.

As shown in FIG. 4, the home base station 3 includes a mobile-station-signal receiving unit 302 for receiving signals from mobile stations via a receiving antenna 301; a mobile-station-signal transmitting unit 304 for transmitting signals to mobile stations via a transmitting antenna 303; and a network interface 305 connected to an upper node, i.e., the controller 1 and configured to transfer user data and control data received by the mobile-station-signal receiving unit 302, to transfer user data and control data to be transmitted by the mobile-station-signal transmitting unit 304, and to input and output control data to and from other components of the home base station 3.

The home base station 3 also includes a base-station-signal receiving unit 307 that receives a common control channel such as a BCH from a neighboring macro base station via a receiving antenna 306 while the home base station 3 is active; and a tracking-area-correspondence establishing unit 308 that requests the base station control unit 12 of the controller 1 via the network interface 305 to associate a tracking area corresponding to the cell ID of the neighboring macro base station received by the base-station-signal receiving unit 307 with the cell ID of the home base station 3.

Further, the home base station 3 includes a radio-unit-state management unit 309 configured to change states of the home base station 3 in response to a state control command received via the network interface 305 from the base station control unit 12 of the controller 1, to report the changed state via the network interface 305 to the base station control unit 12, and to request the base station control unit 12 to discard correspondence data associating the home base station 3 with a tracking area when the home base station 3 is to be turned off. The radio-unit-state management unit 309 controls states of the home base station 3. For example, when a radio-unit-start command is received from the base station control unit 12, the radio-unit-state management unit 309 causes the home base station 3 to transition to the serving state; and when a radio-unit-stop command is received, the radio-unit-state management unit 309 causes the home base station 3 to transition to the radio-unit inactive state.

Figure 5:
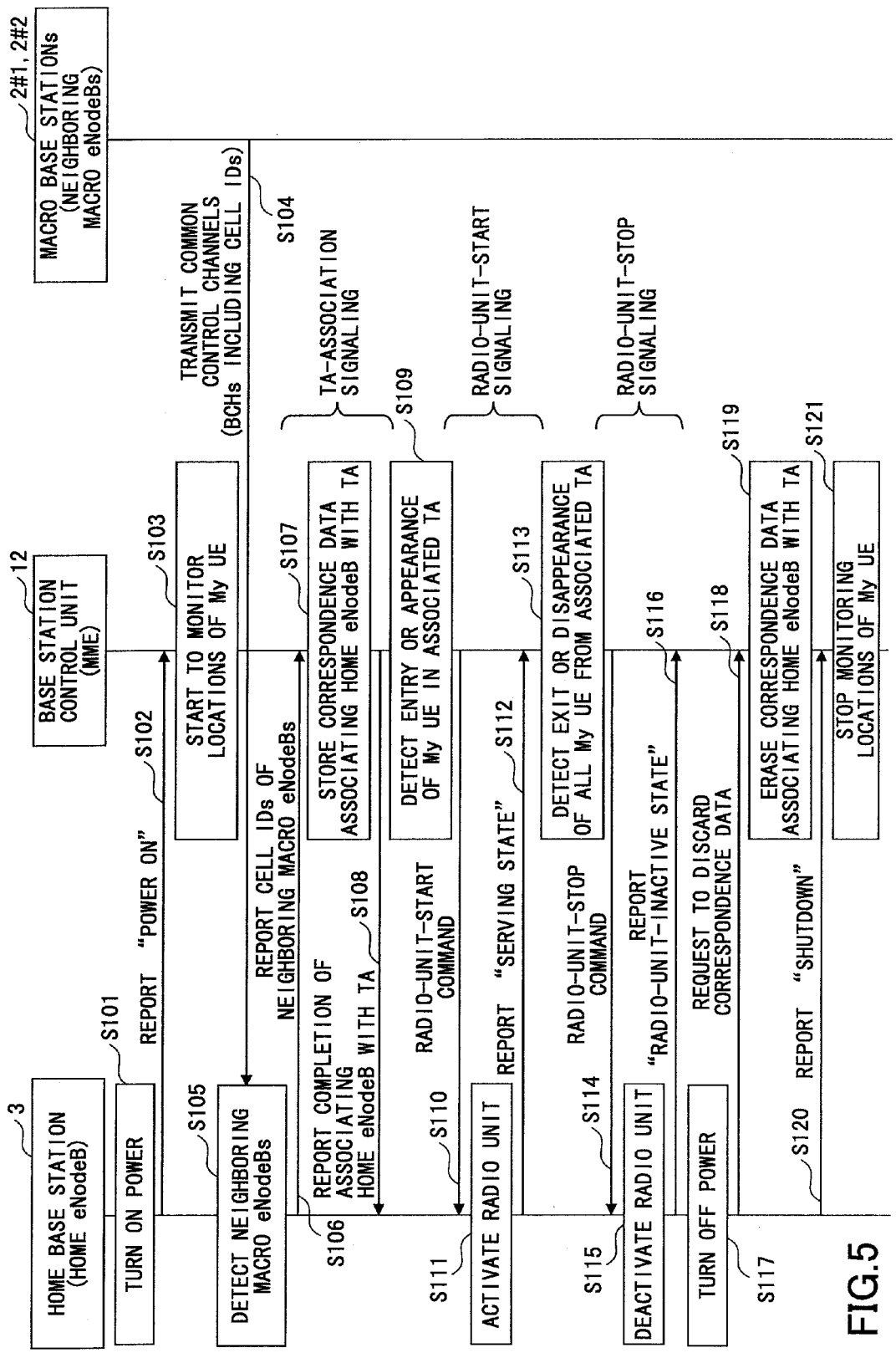
FIG. 5 is a sequence chart showing an exemplary process according to the first embodiment.

FIG. 5 is a sequence chart showing an exemplary process according to the first embodiment.

In FIG. 5, when the power of the home base station 3 is turned on (step S101), the home base station 3 reports to the base station control unit 12 of the controller 1 that the power is turned on (step S102). When receiving the report, the base station control unit 12 starts to monitor locations, on a tracking area basis, of mobile stations (My UE) of users who are allowed to access the home base station 3 (step S103).

Next, the macro base stations 2#1 and 2#2 transmit common control channels (step S104). The home base station 3 receives the common control channels and thereby detects the macro base stations 2#1 and 2#2 that are located near the home base station 3 (step S105). Then, the home base station 3 reports the cell IDs of the detected macro base stations 2#1 and 2#2 to the base station control unit 12 of the controller 1 (step S106). In response, the base station control unit 12 associates the reported cell IDs of the macro base stations 2#1 and 2#2 (or corresponding tracking area) with the cell ID of the home base station 3 and stores the associated IDs as correspondence data (S107) and reports completion of the association to the home base station 3 (step S108).

When the base station control unit 12 of the controller 1 detects that any one of the mobile stations of the users allowed to access the home base station 3 has entered or appeared in a tracking area associated with the home base station 3 (step S109) and if the home base station 3 is in the radio-unit inactive state, the base station control unit 12 transmits a radio-unit-start command to the home base station 3 (step S110). When receiving the radio-unit-start command, the home base station 3 activates the radio unit and thereby transitions into the serving state (step S111) and reports the transition to the serving state to the base station control unit 12 (step S112).

After that, if the base station control unit 12 detects that all of the mobile stations of the users allowed to access the home base station 3 have exited or disappeared from the tracking area associated with the home base station 3 (step S113) and if the home base station 3 is in the serving state, the base station control unit 12 transmits a radio-unit-stop command to the home base station 3 (step S114). When receiving the radio-unit-stop command, the home base station 3 deactivates the radio unit and thereby transitions into the radio-unit inactive state (step S115) and reports the transition to the radio-unit inactive state to the base station control unit 12 (step S116).

In a similar manner, each time entry or appearance of any one of the mobile stations of the users, who are allowed to access the home base station 3, in the tracking area associated with the home base station 3 is detected, the home base station 3 transitions into the serving state; and each time exit or disappearance of all of the mobile stations of the users, who are allowed to access the home base station 3, from the tracking area associated with the home base station 3 is detected, the home base station 3 transitions into the radio-unit inactive state.

When turning off the home base station 3 (step S117), the home base station 3 requests the base station control unit 12 of the controller 1 to discard the correspondence data (step S118). In response to the request, the base station control unit 12 erases the correspondence data of the home base station 3 (step S119).

Then, the home base station 3 reports its shutdown to the base station control unit 12 of the controller 1 (step S120) and when receiving the report, the base station control unit 12 stops monitoring the mobile stations of the users allowed to access the home base station 3 (step S121).

Thus, in this embodiment, the home base station 3 is caused to transition between the serving state and the radio-unit inactive state based on whether any user allowed to access the home base station 3 is in a tracking area corresponding to the macro base stations 2#2 and 2#2 located near the home base station 3 and/or based on the operational status of the user. This configuration makes it possible to cause the home base station 3 to provide normal service when a user needs the service, and to reduce the power consumption of the home base station 3 and the interference caused by the common control channel when no user needs the service.

Second Embodiment

Let us assume that a communicating mobile station is handed over from an unknown macro base station to a home base station. A second embodiment provides, in addition to the functions described in the first embodiment, a function to include the unknown macro base station as a neighboring macro base station corresponding to a tracking area to be associated with the home base station. For example, there is a case where a macro base station that is undetectable by a home base station can be detected at an edge of the service area of the home base station (e.g., at an edge of a room). In such a case, to always enable handover from the undetectable macro base station to the home base station, it is necessary to place the home base station in the serving state beforehand. Including the service area of an unknown macro base station from which a mobile station is handed over to a home base station as one of service areas to be monitored makes it possible to cause the home base station in the radio-unit inactive state to return to the serving state without delay when a mobile station is handed over next time from the unknown macro base station.

In this embodiment, it is assumed that the mobile communication system has a configuration as shown in FIG. 1. It is also assumed that macro base stations and mobile stations have configurations generally employed in a typical mobile communication system. Further, the base station control unit 12 has substantially the same configuration as that shown in FIG. 3.

Figure 6:
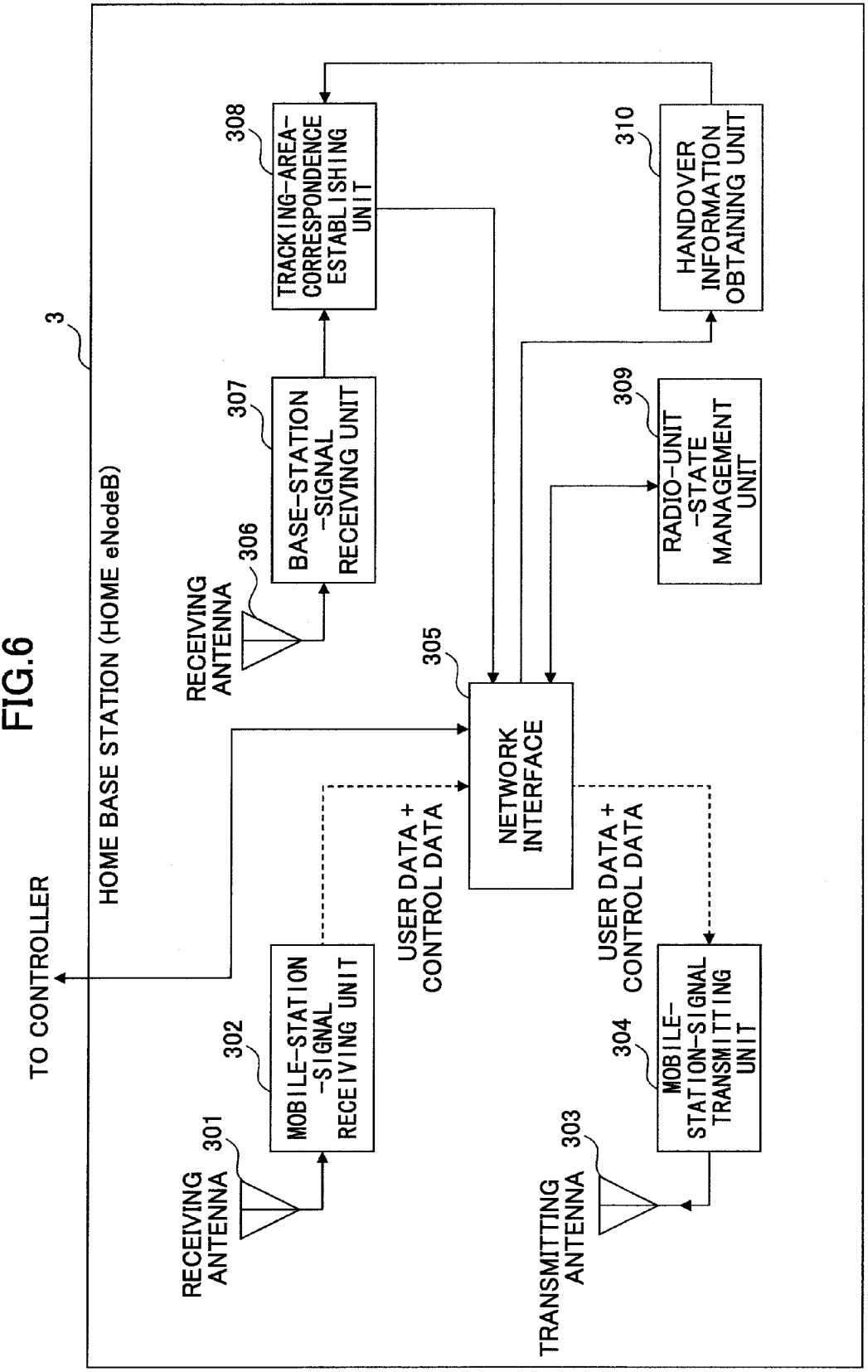
FIG. 6 is a block diagram illustrating an exemplary configuration of a home base station according to a second embodiment.

FIG. 6 shows an exemplary configuration of the home base station 3 according to the second embodiment. The configuration of FIG. 6 is substantially the same as that shown in FIG. 4 except that a handover information obtaining unit 310 is added. When handover of a mobile station from a handover-originating macro base station to the home base station 3 is detected, the handover information obtaining unit 310 obtains the cell ID of the handover-originating macro base station from the mobile station via the receiving antenna 301, the mobile-station-signal receiving unit 302, and the network interface 305 or from the controller 1 via the network interface 305, and requests the tracking-area-correspondence establishing unit 308 to associate the obtained cell ID (or a corresponding tracking area) with the cell ID of the home base station 3.

Figure 7:
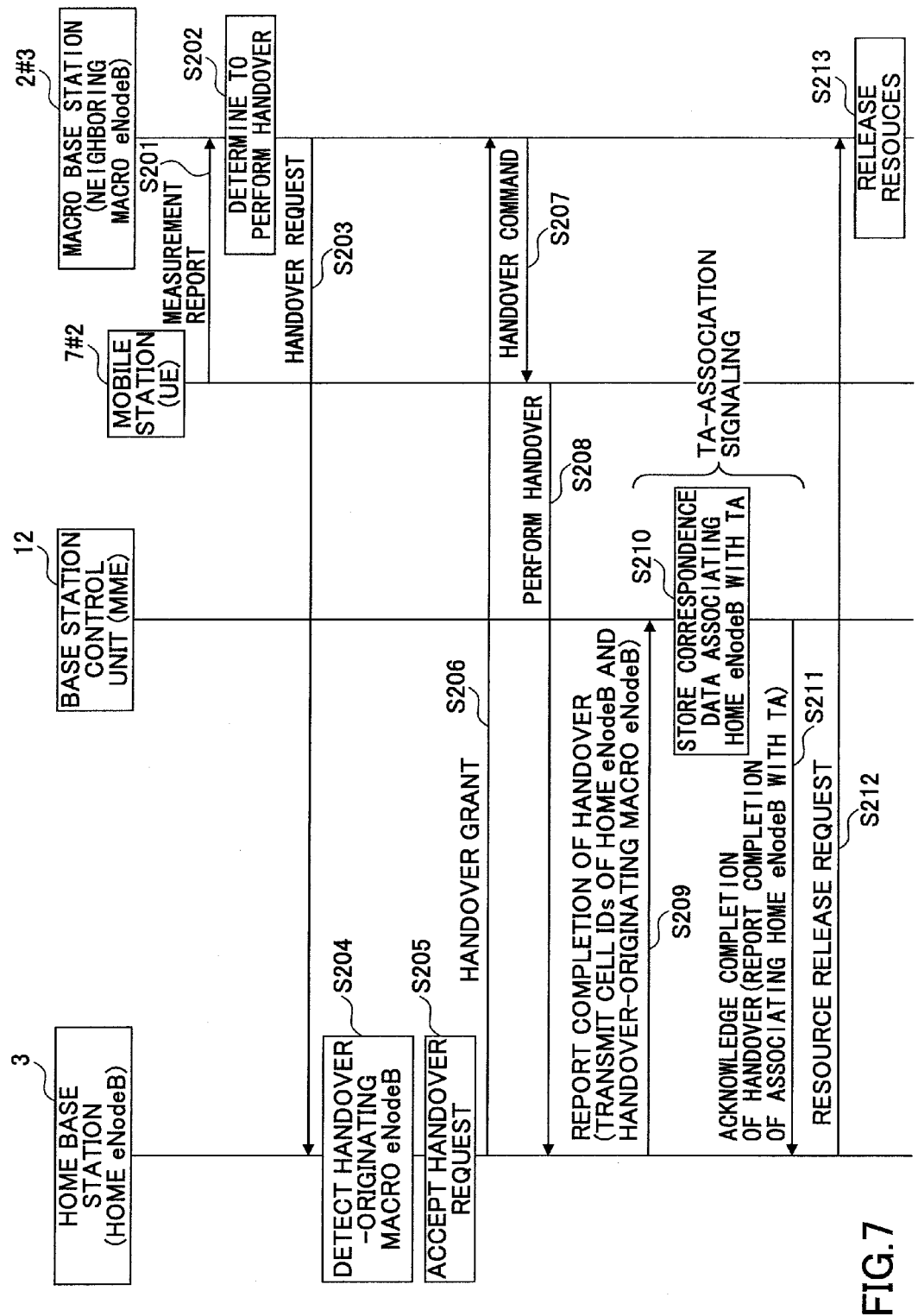
FIG. 7 is a sequence chart showing an exemplary process according to the second embodiment.

FIG. 7 is a sequence chart showing an exemplary process according to the second embodiment. In FIG. 7, steps that are different from those shown in FIG. 5 of the first embodiment are described. In other words, FIG. 7 shows steps to be performed between steps S108 and S109 shown in FIG. 5, and other steps (steps S101 through S108 and steps S109 through S121) are the same as those shown in FIG. 5.

In FIG. 7, when the mobile station 7#2 in the service area of the macro base station 2#3 transmits a measurement report to the macro base station 2#3 (step S201), the macro base station 2#3 determines whether to perform handover based on the measurement report. When it is determined to perform handover (step S202), the macro base station 2#3 transmits a handover request to the home base station 3 (step S203).

The home base station 3 receives the handover request and thereby detects the handover-originating macro base station 2#3 (step S204) and determines whether to accept the handover request. When it is determined to accept the handover request (step S205), the home base station 3 transmits a handover grant to the macro base station 2#3 (step S206).

When receiving the handover grant, the macro base station 2#3 transmits a handover command to the mobile station 7#2 (step S207), and then the mobile station 7#2 performs handover from the macro base station 2#3 to the home base station 3 (step S208).

When the handover is completed, the home base station 3 transmits its own cell ID and the cell ID of the handover-originating macro base station 2#3 to the base station control unit 12 of the controller 1 to report the completion of the handover (step S209). In response, the base station control unit 12 associates the cell ID of the home base station 3 and the cell ID of the macro base station 2#3 (or a corresponding tracking area), stores the associated cell IDs as correspondence data (S210), and reports completion of the association to the home base station 3 to acknowledge the completion of the handover (step S211).

Then, the home base station 3 transmits a resource release request to the macro base station 2#3 (step S212) and the macro base station 2#3 releases resources (step S213).

Thereafter, locations of mobile stations are monitored and states of the home base station 3 are controlled in a similar manner as shown in FIG. 5. In this embodiment, however, the service area of the macro base station 2#3, which is not monitored in the process of FIG. 5, is also associated with the home base station 3 as a tracking area. Therefore, in this embodiment, the base station control unit 12 also monitors entry/appearance and exit/disappearance of mobile stations of users, who are allowed to access the home base station 3, in and from the service area of the macro base station 2#3.

Third Embodiment

In a third embodiment, the process between the home base station 3 and the base station control unit 12 is different from that described in the second embodiment. In this embodiment, steps for reporting and acknowledging completion of handover and steps for associating the home base station 3 and a tracking area are performed separately; and the steps for associating the home base station 3 and a tracking area are performed after the steps for reporting and acknowledging completion of handover and releasing resources of the macro base station 2#3. Configurations of the mobile communication system and its constituent components are substantially the same as those described in the second embodiment.

Figure 8:
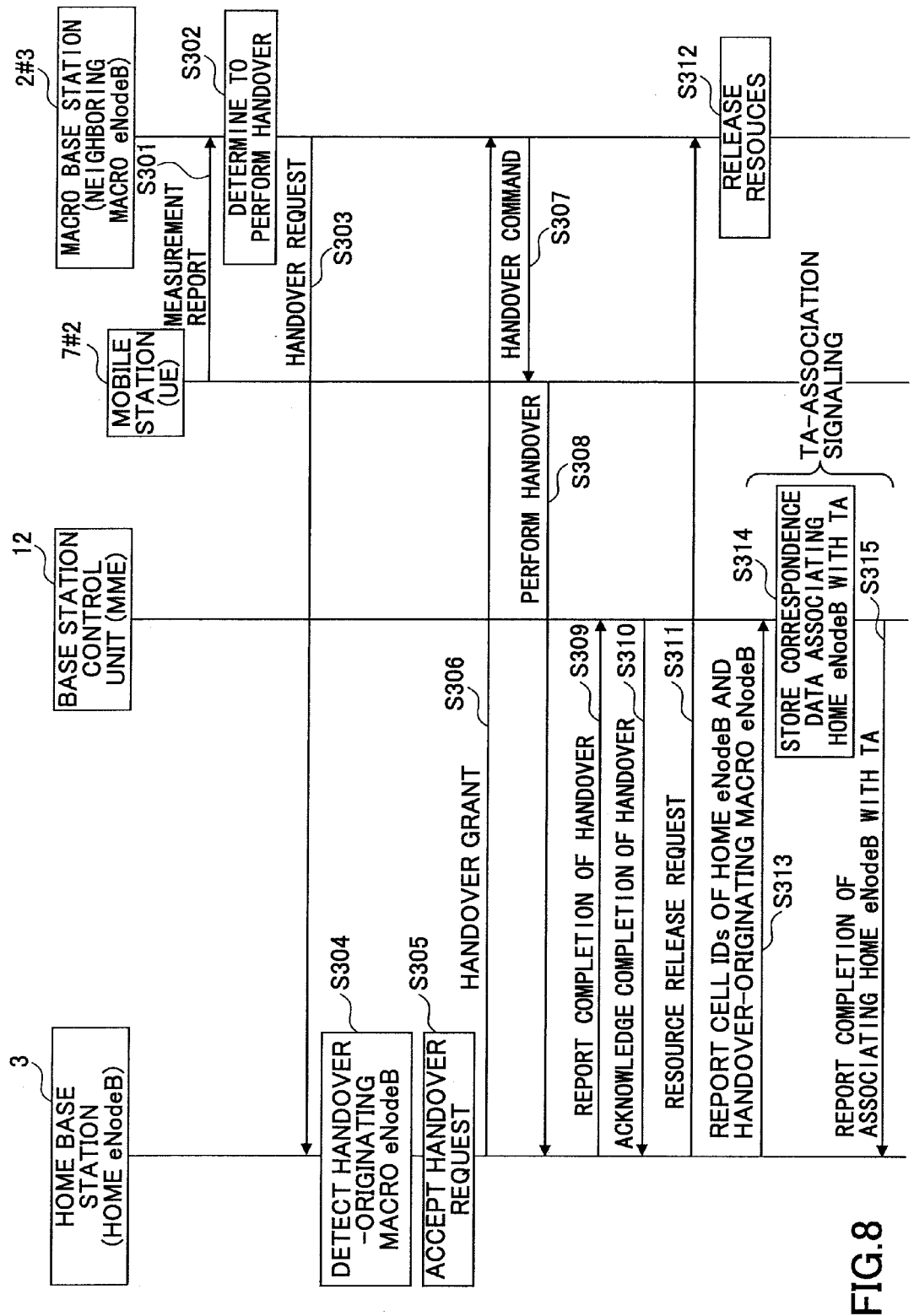
FIG. 8 is a sequence chart showing an exemplary process according to a third embodiment.

In FIG. 8, when the mobile station 7#2 in the service area of the macro base station 2#3 transmits a measurement report to the macro base station 2#3 (step S301), the macro base station 2#3 determines whether to perform handover based on the measurement report. When it is determined to perform handover (step S302), the macro base station 2#3 transmits a handover request to the home base station 3 (step S303).

The home base station 3 receives the handover request and thereby detects the handover-originating macro base station 2#3 (step S304) and determines whether to accept the handover request. When it is determined to accept the handover request (step S305), the home base station 3 transmits a handover grant to the macro base station 2#3 (step S306).

When receiving the handover grant, the macro base station 2#3 transmits a handover command to the mobile station 7#2 (step S307), and then the mobile station 7#2 performs handover from the macro base station 2#3 to the home base station 3 (step S308).

Next, the home base station 3 reports completion of the handover to the base station control unit 12 of the controller 1 (step S309), and the base station control unit 12 reports acknowledgement of the completion of the handover to the home base station 3 (step S310).

Then, the home base station 3 transmits a resource release request to the macro base station 2#3 (step S311) and the macro base station 2#3 releases resources (step S312).

After that, the home base station 3 reports its own cell ID and the cell ID of the handover-originating macro base station 2#3 to the base station control unit 12 (step S313). In response, the base station control unit 12 associates the cell ID of the home base station 3 with the cell ID of the macro base station 2#3, stores the associated IDs as correspondence data (S314), and reports completion of the association to the home base station 3 (step S315).

Thereafter, locations of mobile stations are monitored and states of the home base station 3 are controlled in a similar manner as shown in FIG. 5. In this embodiment, however, the service area of the macro base station 2#3, which is not monitored in the process of FIG. 5, is also associated with the home base station 3 as a tracking area. Therefore, in this embodiment, the base station control unit 12 also monitors entry/appearance and exit/disappearance of mobile stations of users, who are allowed to access the home base station 3, in and from the service area of the macro base station 2#3.

Variations

If the home base station 3 is unable to detect a neighboring macro base station (for example, when the home base station 3 is installed in a place that external radio signals cannot reach), the home base station 3 may be configured to report the cell ID of a nearby home base station to the base station control unit 12 of the controller 1 and thereby to request the base station control unit 12 to associate the home base station 3 with the service area of a macro base station detected by the nearby home base station.

Also, if the home base station 3 is unable to detect a neighboring macro base station, the home base station 3 may be configured to report that no macro base station is detectable to the base station control unit 12 of the controller 1 and thereby to request the base station control unit 12 to associate the home base station 3 with a special tracking area (null). In this case, if the location of any one of mobile stations of users allowed to access the home base station 3 associated with the special tracking area (null) becomes not monitorable, the base station control unit 12 causes the home base station 3 to transition to the serving state; and if locations of all the mobile stations of users allowed to access the home base station 3 associated with the special tracking area (null) become monitorable, the base station control unit 12 causes the home base station 3 to transition to the radio-unit-inactive state. This configuration makes it possible to prevent the home base station 3 from being kept in the radio-unit-inactive state even when a mobile station is approaching the home base station 3.

Further, components or functions for implementing the present invention may be combined or distributed in various manners. For example, the controller 1 may be provided for each of the macro base stations 2#1, 2#2, and 2#3, and may be integrated into each of the macro base stations 2#1, 2#2, and 2#3. In this case, the home base station 3 may be controlled by the macro base stations 2#1, 2#2, and 2#3. Also, the controller 1 may be configured to be able to control the home base station 3 via another controller 1 or one of the macro base stations 2#1, 2#2, and 2#3 in addition to directly controlling the home base station 3. Further, when the controller 1 is integrated into each of the macro base stations 2#1, 2#2, and 2#3, each of the macro base stations 2#1, 2#2, and 2#3 may be configured to be able to control the home base station 3 via another controller 1 or another one of the macro base stations 2#1, 2#2, and 2#3 in addition to directly controlling the home base station 3.

SUMMARY

As described above, embodiments of the present invention make it possible:

(1) To activate only home base stations that are likely to be used and thereby to reduce power consumption;

(2) To prevent transmission of signals from home base stations that are not likely to be used and thereby to prevent interference with other cells; and (3) To automatically change states of a home base station and thereby to reduce the workload of an administrator.

Preferred embodiments of the present invention are described above. However, the present invention is not limited to the specifically disclosed embodiments, and variations and modifications may be made without departing from the scope of the present invention. Accordingly, the descriptions and drawings in the above embodiments should not be construed to be limiting the present invention.

The present international application claims priority from Japanese Patent Application No. 2007-120263 filed on Apr. 27, 2007 and Japanese Patent Application No. 2007-211093 filed on Aug. 13, 2007, the entire contents of which are hereby incorporated herein by reference.

The invention claimed is:

1. A mobile communication system, comprising:
an association requesting unit provided in a first base station, and configured to try to receive a radio signal from a second base station when the first base station is turned on and when the radio signal is received, to request a base station controller, which is an upper node, to associate the first base station with a tracking area corresponding to a service area of the second base station; and
a state control unit provided in the base station controller and configured to monitor entry or appearance and exit or disappearance of mobile stations allowed to access the first base station in and from the tracking area associated with the first base station, to cause the first base station to transition to a serving state when at least one of the mobile stations enters or appears in the tracking area, and to cause the first base station to transition to a radio-unit-inactive state when all of the mobile stations exit or disappear from the tracking area,
wherein, when no neighboring base station is detected, the association requesting unit is configured to report that no neighboring base station is detectable to the base station controller and thereby request the base station controller to associate the first base station with a special tracking area; and
wherein the state control unit is configured to cause the first base station associated with the special tracking area to transition to the serving state when a location of at least one of the mobile stations allowed to access the first base station becomes not monitorable and to cause the first base station to transition to the radio-unit-inactive state when locations of all of the mobile stations become monitorable.

2. The mobile communication system as claimed in claim 1, wherein when no neighboring base station is detected, the association requesting unit is configured to report on a third base station located near the first base station to the base station controller and thereby request the base station controller to associate the first base station with a tracking area of a fourth base station detected by the third base station.

3. A base station controller, comprising:

an associating unit configured to associate a first base station belonging to the base station controller with a tracking area corresponding to a service area of a second base station when requested by the first base station; and a state control unit configured to monitor entry or appearance and exit or disappearance of mobile stations allowed to access the first base station in and from the tracking area associated with the first base station, to transmit a command to the first base station to cause the first base station to transition to a serving state when at least one of the mobile stations enters or appears in the tracking area, and to transmit a command to the first base station to cause the first base station to transition to a radio-unit-inactive state when all of the mobile stations exit or disappear from the tracking area, wherein, when no neighboring base station is detected, the association requesting unit is configured to report that no neighboring base station is detectable to the base station controller and thereby request the base station controller to associate the first base station with a special tracking area; and wherein the state control unit is configured to cause the first base station associated with the special tracking area to transition to the serving state when a location of at least one of the mobile stations allowed to access the first base station becomes not monitorable and to cause the first base station to transition to the radio-unit-inactive state when locations of all of the mobile stations become monitorable.

4. A base station state control method, comprising:

a step, performed by a first base station, of trying to receive a radio signal from a second base station when the first base station is turned on and requesting a base station controller, which is an upper node, to associate the first base station with a tracking area corresponding to a service area of the second base station when the radio signal is received; and a step, performed by the base station controller, of monitoring entry or appearance and exit or disappearance of mobile stations allowed to access the first base station in and from the tracking area associated with the first base station, causing the first base station to transition to a serving state when at least one of the mobile stations enters or appears in the tracking area, and causing the first base station to transition to a radio-unit-inactive state when all of the mobile stations exit or disappear from the tracking area, wherein, when no neighboring base station is detected, the association requesting unit is configured to report that no neighboring base station is detectable to the base station controller and thereby request the base station controller to associate the first base station with a special tracking area; and wherein the state control unit is configured to cause the first base station associated with the special tracking area to transition to the serving state when a location of at least one of the mobile stations allowed to access the first base station becomes not monitorable and to cause the first base station to transition to the radio-unit-inactive state when locations of all of the mobile stations become monitorable.

* * * * *

UNITED STATES PATENT AND TRADEMARK OFFICE
CERTIFICATE OF CORRECTION

| | | Page 1 of 1 |
|---|---|---|
| PATENT NO. | : 8,417,249 B2 | |
| APPLICATION NO. | : 12/596942 | |
| DATED | : April 9, 2013 | |
| INVENTOR(S) | : Mori et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 585 days.

Signed and Sealed this
Seventeenth Day of May, 2016

Michelle K. Lee
*Director of the United States Patent and Trademark Office*